United States Patent

[11] 3,608,558

[72] Inventors Vernon H. Sietmann
 Laurel, Iowa 50141;
 Gerald F. Dendel, 236 E. 16th St., Costa Mesa, Calif. 92627
[21] Appl. No. 801,514
[22] Filed Feb. 24, 1969
[45] Patented Sept. 28, 1971

[54] AIR MANIFOLD FOR A COMBINE CHAFFER MATERIAL LEVELER AND AERATOR
 9 Claims, 5 Drawing Figs.
[52] U.S. Cl. .................................................. 130/27 AE
[51] Int. Cl. .................................................. A01f 12/48
[50] Field of Search .................................... 130/27.18, 24

[56] References Cited
 UNITED STATES PATENTS
 2,694,493  11/1954  Odegarden ................... 130/27.18
 2,750,037   6/1956  Taylor ........................... 130/27.18
 3,456,652   7/1969  Louks et al. .................. 130/27.18
 3,495,598   2/1970  Louks et al. .................. 130/27.18

Primary Examiner—Antonio F. Guida
Attorney—Zarley, McKee & Thomte

ABSTRACT: This invention relates to an attachment for a conventional grain combine which includes a sieve or chaffer area where the grain is delivered for finish cleaning, and comprises a high-speed blower that automatically delivers a flow of air under static pressure through a pendulum-operated valve for controlled transmission of air through a plurality of conduits arranged in parallel to manifolds on opposite sides of the chaffer and to a manifold extended tranversely across the combine. All of the manifolds are mounted adjacent the front of the chaffer to deliver a majority of air to the downhill side of the chaffer for directing grain to the uphill side while always maintaining a small amount of air to the uphill side to prevent clogging of the uphill manifold, and to deliver air through the transverse manifold to direct air to the substantially horizontal flow of grain to thereby separate chaff and trash from the heavier grain, effecting an aeration of the material which aids in cleaning. The manifolds on the opposite side of the chaffer are stationary and are not movable with the chaffer. Each of the oppositely disposed manifolds includes a manifold housing connected to its respective conduit and extending downwardly therefrom. A horizontally disposed discharge opening is provided in the manifold housing above the lower end thereof. The cross-sectional area of the lower end of the manifold housing is less than the cross-sectional area at the upper end of the housing to maintain peak output pressure.

PATENTED SEP 28 1971  3,608,558
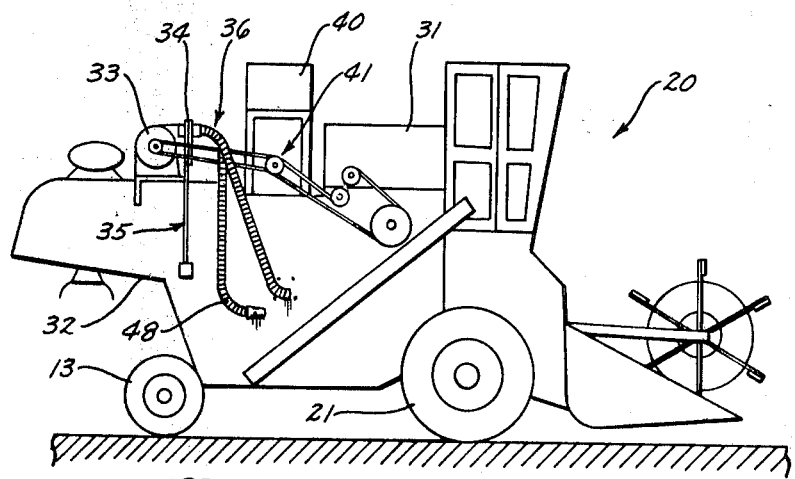
Fig. 1
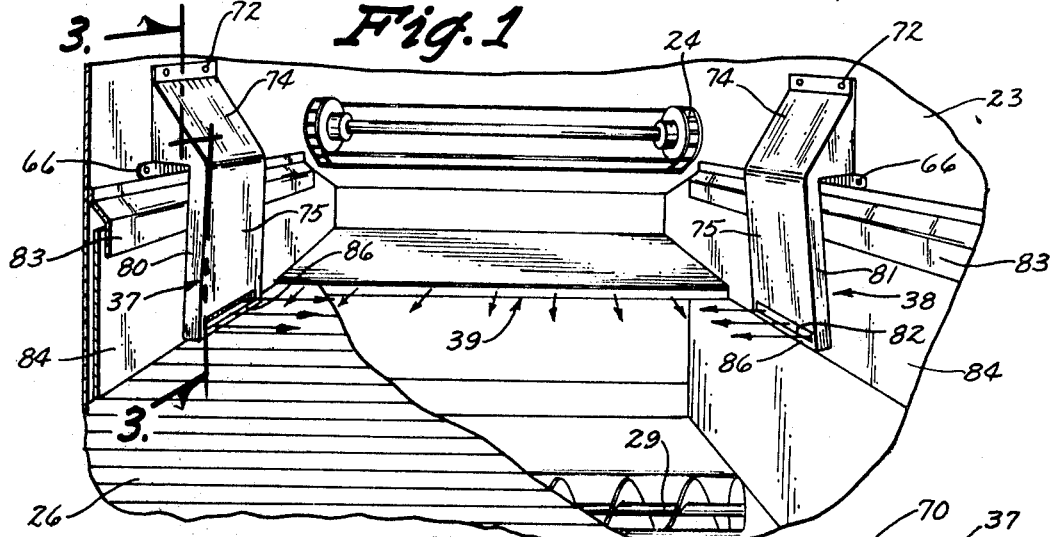
Fig. 2
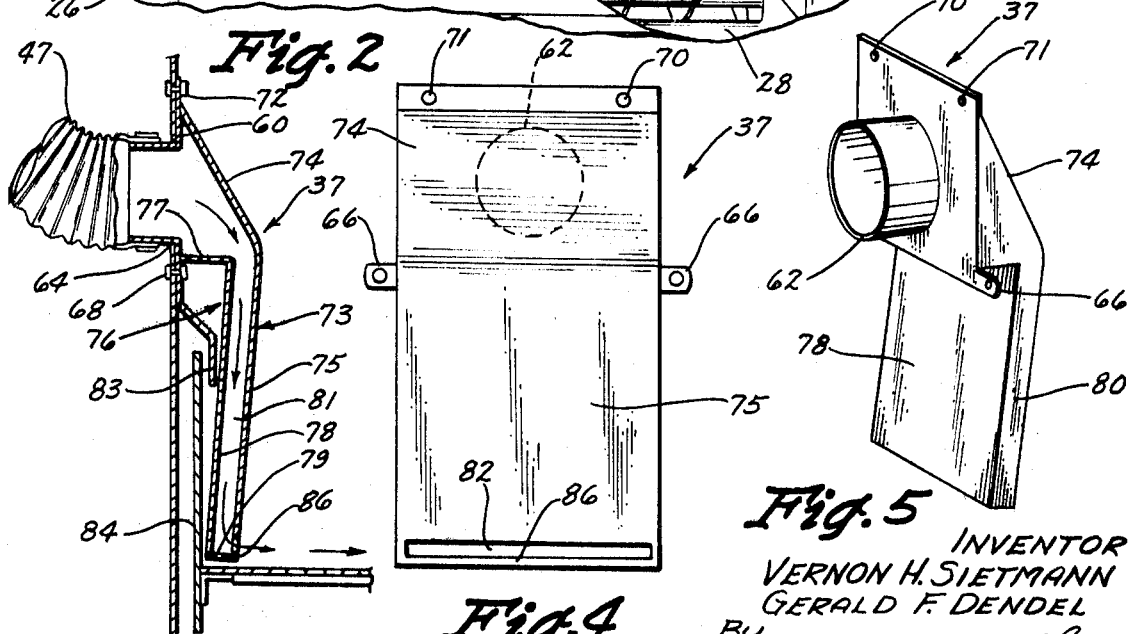
Fig. 3
Fig. 4
Fig. 5
INVENTOR
VERNON H. SIETMANN
GERALD F. DENDEL
BY Zarley, McKee & Thomte
ATTORNEYS

AIR MANIFOLD FOR A COMBINE CHAFFER MATERIAL LEVELER AND AERATOR

CROSS-REFERENCES TO RELATED APPLICATION

Reference is made to the copending applications as to the same subject matter in Ser. No. 514,859 filed Dec. 20, 1965, which issued on July 22, 1969, as U.S. Pat. No. 3,456,652, and Ser. No. 595,852 filed Nov. 21, 1966, which issued on Feb. 17, 1970 as U.S. Pat. No. 3,495,598.

BACKGROUND OF THE INVENTION

This invention relates generally to a grain harvester and more particularly to an apparatus for aiding the separation of grain from the straw and chaff. More particularly, this invention relates to an improvement in the oppositely disposed manifolds of the invention disclosed in Ser. No. 710,230 filed Mar. 4, 1968.

In recent years, the combine harvester, or harvester-thresher has become the universally accepted machine for harvesting grain crops. A conventional machine of this character comprises a body unit containing threshing and separating apparatus, which carries in front of it a header unit containing grain cutting and conveying apparatus. As the machine is moved through the fields, grain cut by the cutting apparatus is conveyed to the body unit where it is threshed, and where the grain kernels are separated from the straw and chaff.

Conventional grain harvesters include as a part of the separating mechanism horizontally disposed screens or sieves upon which the kernels, chaff, and unthreshed heads are deposited after the straw is separated from them. The screens or sieves are reciprocated rapidly in a fore and aft direction in the path of a rearwardly and upwardly directed stream of air from a fan mounted in the body unit to separate the kernels from the chaff and unthreshed heads. The small, relatively heavy kernels pass through the screens and are collected therebeneath. The light chaff is blown out of the rear end of the body unit. The unthreshed heads, being too large to pass through the screens but too heavy to be blown with the chaff, drop from the rear edges of the screens into a return auger and are collected for rethreshing.

Further included in conventional grain harvesters is a blower fan mounted beneath the separation and cleaning housing which pulls air in from each end thereof and forces it, through a port or duct, upwardly and through the sieve or screen area. In certain areas of terrain, it has been found that the air pulled in by the blower fan and forced through the screens is so dirty and full of foreign materials itself, the efficiency of the forced air is considerably lowered.

It can readily be seen that for the separation process to be efficient so as to separate all the kernels from the straw and chaff, the grain must be maintained in a level condition on top of at least the uppermost screen. In operation of this type machine over fairly level terrain, the problem is not too serious. One present day method of solving the present problem is by the use of laterally spaced dividers or separators extended longitudinally on top of the screens.

In hilly areas, however, the problem is more serious, losses of from 5–10 bushels of grain an acre being reported, due to the uneven distribution of the grain on the screens. Many solutions of this problem have been suggested, with several being presently used. The great majority of these deal with mechanisms for maintaining the screens themselves level during movement of the combine over the hilly terrain.

In the first copending application, Ser. No. 514,859 a partial solution to this problem was disclosed. In that disclosure, the air dispensing manifolds were placed on opposite sides of the chaffer housing in a stationary manner, and with air under pressure, derived from a blower fan auxiliary to the underside blower fan, emitted from the manifolds transversely across the chaffer.

Continuing tests and development of that structure showed several areas of improvement. It was ascertained that certain riddles or screens are reciprocated not only fore and aft, but also slightly upwardly and downwardly. Thus, the fixed manifold housing did not always force a blanket of air directly over the surface of the oscillating screens. Furthermore, material tended to lodge beneath the manifold housings and distort same as the screens oscillated therebeneath.

It was also found that the source of air pressure for the manifolds could be derived from the underside blower fan without impairing the capacity output thereof for cleaning purposes, and that the efficiency of this arrangement was greatly increased by obtaining clean air from near the top of the combine harvester rather than at the far location.

Additionally, the manifolds were located on opposite sides of the riddle or separator unit in the alternative to the riddle manifolds, and it was ascertained that the efficiency and effectiveness of the system in this area was still considerably greater than that known or obtained in other known forced air systems.

As shown in the second copending application, Ser. No. 595,852 distinct improvements were introduced. Manifolds were placed on opposite sides of the riddle or separator unit, and with a noticeable increase of grain and chaff separation efficiency. Manifolds for the riddle or chaffer area were built into that part of the chaffer which shakes to maintain the transverse airflow constant with the surface of the chaffer. All leveling air was derived from near the top of the combine for cleaner air.

Leveling air was emitted from both manifolds at all times, with the greatest amount from the downhill manifold, but with a small but sufficient amount from the uphill manifold to prevent it from becoming clogged during operation. Additionally, a transversely extended plenum chamber was introduced across the front or inner end of the chaffer to receive the air from both manifolds, and to redirect it upwardly and angularly relative to the normally horizontal flow of grain and chaff, whereby to aerate or separate the chaff and trash upwardly and away from the heavier grain.

As shown in the third copending application, Ser. No. 710,230, distinct improvements were introduced. However, it has been found that the fact that the oppositely disposed manifolds vibrate with the chaffer causes excessive wear on the conduit hoses. It has also been found that a larger area of the chaffer may be subjected to the directed air by providing a stationary manifold rather than the movable manifold disclosed in Ser. No. 710,230. Further, it has also been found that the structure of the manifolds disclosed in Ser. No. 710,230 create some difficulty in the removal of certain of the chaffer components.

SUMMARY OF THE INVENTION

In summary, this invention pertains to an apparatus for aiding the separation of grain from all other material therewith passing longitudinally over a chaffer unit in a conventional threshing machine, and which apparatus comprises generally a blower unit mounted on the machine and operable by connection with the machine to force air under pressure through a conduit group to a pair of manifold housings placed on opposite sides of the chaffer unit at its innermost end, and to a plenum chamber that is extended across the inner end of the chaffer, and which manifold housings and plenum chamber have apertures formed thereinto enable the air under pressure to be directed simultaneously over the upper surface of the chamber in the form of two blankets of air moving in directions normal to each other.

The air is transmitted from the blower unit to the conduit group through a valve assembly which is controlled in response to the tilt of the combine when on uneven terrain, and which valve assembly causes air to be transmitted to both of the hillside manifolds at all times, but with more air always being directed to the low side manifold than to the high side manifold; and wherein air is also directed in parallel with the hillside manifolds to the plenum chamber aerator for emission therefrom at all times that the combine is on substantially level terrain.

More particularly, this invention pertains to an improved design of the oppositely disposed manifolds wherein each of the manifolds includes a manifold housing secured to the conduit and which extends downwardly therefrom. A horizontally disposed discharge opening is provided in the manifold housing above the lower end thereof. The cross-sectional area of the lower end of the housing is less than the cross-sectional area of the upper end of the housing to maintain peak output pressure. The manifold housings of this invention are stationary and do not move with the chaffer to decrease the wear on the conduit hoses. The shape of the manifold housing does not obstruct the material passing through the combine and does not accumulate dirt and debris therearound.

It is an object of this invention to provide an improved combine, particularly in the increased efficiency of the grain cleaning area, wherein more and cleaner grain is provided.

Still another object of the invention is to provide air simultaneously to oppositely disposed stationary manifolds on either side of the riddle or chaffer for hillside leveling control, and to a transverse plenum chamber at the front of the chaffer for forcing air through the flow of grain for separation or aeration purposes, thereby making the grain more clean.

Another object of this invention is to provide an apparatus which can be installed initially as an integral part of a new combine, or which can readily be installed after manufacture of the combine, as an accessory item.

Yet another object of this invention is to provide such an apparatus for emitting an opposing pair of blankets of air under pressure in directions initially normal to the flow of grain over a riddle, which blankets move directly over and parallel to the surface of the riddle.

Yet another object of this invention is to provide an improved manifold housing design suitable for use with the invention disclosed in Ser. No. 710,230 filed Mar. 4, 1968.

A further object of this invention is to provide a manifold housing as described herein which has a decreasing cross-sectional area from its upper to lower ends.

A further object of this invention is to provide a manifold housing having a horizontally disposed discharge opening provided therein spaced above the lower end thereof.

A further object of this invention is to provide a manifold housing which is stationary and does not move with the vibrating chaffer.

A further object of this invention is to provide an apparatus including a manifold housing which permits chaffer components to be easily removed from the combine.

A still further object of this invention is to provide an apparatus including a manifold housing having an exterior shape which does not obstruct and does not accumulate dirt and debris therearound.

A still further object of this invention is to provide an apparatus including a manifold housing which is economical of manufacture, and durable in use.

These objects, and other features and advantages of this invention will become more readily apparent upon reference to the following description when taken in conjunction with the accompanying drawings wherein:

FIG. 1 is a side elevational view of a combine harvester with which the apparatus of this invention is assembled;

FIG. 2 is an enlarged, fragmentary, perspective view of the interior of the chaffer area, looking inwardly from the rear of the combine, with certain parts broken away for clarity of invention;

FIG. 3 is an enlarged partial sectional view as seen along lines 3—3 of FIG. 2;

FIG. 4 is an elevational view of the manifold housing seen in FIG. 3; and

FIG. 5 is a rear perspective view of the manifold housing seen in FIGS. 3 and 4.

DESCRIPTION OF THE PREFERRED EMBODIMENTS

As previously stated, this invention pertains to an improved design of the oppositely disposed manifolds of Ser. No. 710,230 and reference is made to the disclosure of said copending application.

The apparatus of this invention is mounted on a conventional combine indicated generally at 20 in FIG. 1. Combine 20 is mounted on a pair of drive wheels 21 and a pair of rear dolly wheels 13.

The threshing and separating elements of the combine 20 are mounted inside a housing 23, the bottom rear area of which is open. As is well known in the art, after the threshing operation about 90 percent of the grain is passed over a riddle or separator unit 24 (FIG. 2) and thence downwardly to a cleaning mechanism. Grain still remaining in the straw is dislodged by commonly called "straw walkers" (not shown) which are mounted about the cleaning mechanism. Operation of the straw walkers effects a final separation of the grain, whereupon the grain falls downwardly either directly onto the cleaning mechanism or onto a return conveyor for movement to the rear of the mechanism as described more in detail hereinafter.

The cleaning mechanism itself comprises, in this combine 20, a sieve 26, which is reciprocated backwards and forwards longitudinally of the housing 23 to agitate, in conjunction with air from a cleaning fan (not shown), the material deposited thereon. Grain kernels deposited on the sieve 26 are permitted to work therethrough and drop onto a collecting pan 28 therebeneath which forms part of the bottom of the housing 23. The pan 28 contains a grain auger 29 which transports the grain transversely of the combine to an elevator (not shown) where it is elevated to a grain tank 31 mounted on the combine 20. Chaff and other foreign material deposited on the sieve 26 is caught in an air stream and blown out through a discharge opening 32 formed at the rear of the combine housing 23.

An air blower unit 33 is provided on the upper rearward area of the combine 20 and has a valve assembly 34 connected thereto for receiving air therefrom. A control assembly 35 is provided on combine 20 for controlling the operation of the valve assembly 34 to permit the valve assembly 34 to properly distribute air from the blower unit to a conduit group indicated generally at 36. The conduit group 36 includes conduits which are suitably connected to a pair of hillside manifolds 37 and 38 and an aerator housing 39.

The air blower unit 33 comprises a blower fan which has a predetermined static air pressure rating and which is mounted on the upper surface of the combine housing 23 by any convenient means. The air blower unit 33 is driven by the combine engine 40 by suitable belt and pulley apparatus generally indicated at 41 in FIG. 1.

The valve assembly 34 and the valve control assembly 35 operate to control the amount of air transmitted from the air blower unit 33 to the conduit group 36 and also operate to control which of the conduits receive air, and how much air is received by the respective conduits.

Generally speaking, the conduit group 36 includes a pair of outer, hillside, flexible conduits 47 and 48, and a pair of inner, aerator, flexible conduits 51. The two hillside conduits 47 and 48 lead respectively to the pair of hillside manifolds 37 and 38 respectively, which manifolds 37 and 38 are identical and as they are identical, only one will be described.

The manifold 37 includes a back plate 60 having a tubular intake conduit 62 extending transversely therefrom adapted to be received by an opening 64 in housing 23 and adapted to have the conduit 47 detachably connected thereto by any convenient means. Back plate 60 includes a pair of laterally extending wings 66 at the lower end thereof which are provided to facilitate the attachment of the manifold 37 to the housing 23 by means of bolt assembly 68 extending therethrough as illustrated in FIG. 3. The upper end of the back plate 60 is provided with a pair of openings 70 and 71 adapted to receive bolt assemblies 72 extending therethrough for attachment of the manifold to the housing 23.

Manifold 37 includes a front wall 73 having an inclined wall portion 74 extending downwardly and outwardly from the upper end thereof. Front wall 73 includes a wall portion 75 which extends downwardly and inwardly with respect to housing 23 from the lower end of inclined wall portion 74. Manifold 37 includes a backwall 76 having a horizontal portion 77 extending inwardly from backwall 60 and having a wall portion 78 extending downwardly and inwardly from the inner end of wall portion 77 in a parallel relationship with respect to wall portion 75. The lower end of the manifold 37 is closed by a bottom 79 extending between the front and backwalls thereof. Housing 37 also includes a pair of sidewalls 80 extending between the front and backwalls to define a passageway 81 within the manifold. A horizontally disposed discharge opening 82 is provided in front wall 73 above the lower end thereof as seen in FIG. 4 for a reason to be explained hereinafter.

As seen in FIG. 3, the cross-sectional area of the lower end of the manifold 37 is less than the cross-sectional area at the upper end thereof which maintains peak output pressure through the opening 82. As seen in FIG. 3, an acute angle is formed between horizontal wall portion 77 and wall portion 78 so that the manifold 37 may extend over the retaining plate 83 which is secured to the interior surface of housing 23 while causing the lower end of the manifold 37 to be positioned as close to the wall 84 which is secured to the sieve 26 and which moves therewith.

In operation, a proper amount of air is furnished to the manifolds 37, 38 and 39 by the fan means 33 through the valve means 34 and into the conduit group 36 and such air would depend upon the attitude of the combine with respect to the horizontal. Air is forced into the conduit 47 and into the tubular member 62 of the manifold 37. The air is forced downwardly through the passageway 82 in manifold 37 and outwardly through the discharge opening 82 formed in the lower end thereof. The fact that the manifold 37 is stationary with respect to the vibrating sieve 26 reduces wear on the manifold 37 and the conduit 47. The design of the manifold 37 as well as its stationary feature permits the manifold to clean a larger area with respect to the sieve 26 since the sieve vibrates approximately one and one-half inches fore and aft three-quarters inch vertically. Such a vibrating action in the path of the stationary draft improves the cleaning action of the combine. The exterior shape of the manifold is such that it does not obstruct the flow of material through the combine and does not permit dirt and debris to accumulate therearound.

The fact that the opening 82 is spaced above the lower end of the manifold 37 (see lip 86, FIGS. 3 and 4) provides much better cleaning action than if the discharge opening were placed flush with the bottom of the conduit. Additionally, by providing the opening 82 in a spaced relationship with the bottom of the manifold 37 makes it impossible to plug or clog the manifold 37 by the debris being directed thereagainst by the opposing manifold since the worst that could happen is that only that portion of passageway 81 between the opening 82 and the bottom of the manifold 37 would become plugged. The material would not pass upwardly into the passageway 81 above the opening 82 under any condition. It was found that in certain of the previous designs of the copending applications, come clogging would occur in the manifolds which would reduce the efficiency of the unit.

As seen in FIG. 3, the cross-sectional area of the lower end of the manifold 37 is less than the cross-sectional area of the upper end of the manifold 37 which permits the unit to maintain peak output pressure at the discharge opening 82. By designing the manifold 37 in such a way that the lower end extends inwardly and downwardly from the upper end as best viewed in FIG. 3, it is possible to position the lower end of the manifold 37 closely adjacent the wall 84 while permitting the unit to extend over the element 83. The design of the manifold 37 also makes it possible to remove the internal components of the combine for repair and/or replacement. The opposing currents of air which are emitted by the manifolds 37 and 38 together with the manifold 39 to aid in the separation of the chaff and debris from the grain kernels. The manner in which the air is supplied to the manifolds and the amount supplied thereto does not necessarily form a part of this invention since this invention is primarily directed to the structure of the manifolds 37 and 38 which permits improved reaction of the combine chaffer material leveler and aerator such as disclosed in Ser. No. 710,230 filed Mar. 4, 1968. Thus it can be seen that the device accomplishes at least all of its stated objectives.

Some changes may be made in the construction and arrangement of our air manifold for a combine chaffer material leveler and aerator without departing from the real spirit and purpose of our invention, and it is our intention to cover by our claims, any modified forms of structure or use of mechanical equivalents which may be reasonably included within their scope.

We claim:

1. Apparatus for use with a threshing machine, said threshing machine having a housing and a chaffer unit conventionally mounted for reciprocating movement within said housing, said chaffer unit having a sieve and lateral walls extending upwardly from the opposite sides of said sieve, and said walls being adapted to reciprocate with said chaffer unit, said apparatus comprising:

blower means mounted on said machine and operable by said machine to pull in air from the atmosphere;

conduit means connected to said blower means for receiving and transmitting air under pressure therefrom;

manifold means mounted on opposite sides of said chaffer unit within said housing and connected to said conduit means;

said manifold means having a pair of manifold housings each connected to said housing of said threshing machine and extending downwardly between said lateral walls of said chaffer unit to terminate in a lower end adjacent said sieve and in close proximity to one of said lateral walls, said lower ends being free from motion transmitting connection with said lateral walls and said sieve;

said lower ends each having a substantially horizontal discharge opening formed therein extended substantially parallel to and above the surface of said sieve.

2. The apparatus of claim 1 wherein said manifold means are rigidly secured to said housing in a stationary manner and wherein said chaffer unit is movably mounted in said housing and moves with respect to said manifold means.

3. The apparatus of claim 2 wherein each of said manifold housings have a passageway formed therein extending between upper and lower ends, the cross-sectional area of the lower end of said passageway being less than the cross-sectional area of the upper end of said passageway.

4. The apparatus of claim 2 wherein said manifold housings each include upper and lower ends, said manifold housing being connected at its upper end to said conduit means, said horizontal discharge opening being formed in said manifold housing above the lower end thereof.

5. The apparatus of claim 4 wherein said manifold housings each include an upper manifold housing portion and a lower manifold housing portion which extends downwardly and inwardly therefrom towards said housing.

6. The apparatus of claim 5 wherein the cross-sectional configuration of said lower manifold housing portion is rectangular.

7. The apparatus of claim 6 wherein said machine housing includes oppositely disposed sidewalls to which said manifold means are detachably secured, each of said manifold housings including a tubular intake portion at their upper ends extending through an opening formed in said sidewall, said conduit means being connected to said tubular intake portion.

8. The apparatus of claim 1 wherein the discharge openings have a lip along their lower edges which defines the lower edge of said discharge openings, said lower edge of said discharge openings being positioned above the bottom of said manifold means.

9. The apparatus of claim 8 wherein the vertical height of said lip is less than the vertical width of said discharge openings.